C. M. CLARK.

Improvement in Prairie-Plow.

No. 4,948. Reissued June 18, 1872.

Witnesses:

P. C. Dieterich.

Francis McArdle.

Inventor:

C. M. Clark.

PER Munn & Co

Attorneys.

AM. PHOTO-LITHOGRAPHIC CO. N.Y. (OSBORNE'S PROCESS.)

UNITED STATES PATENT OFFICE.

CORNELIUS M. CLARK, OF SEWARD, NEBRASKA.

IMPROVEMENT IN PRAIRIE-PLOWS.

Specification forming part of Letters Patent No. 125,936, dated April 23, 1872; reissue No. 4,948, dated June 18, 1872.

Specification describing a certain Improved Prairie-Breaker, invented by CORNELIUS M. CLARK, of Seward, in the county of Seward and State of Nebraska.

Figure 1:
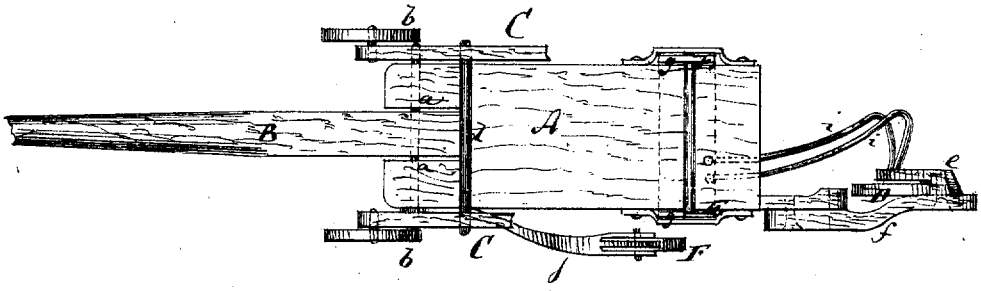
Figure 2:
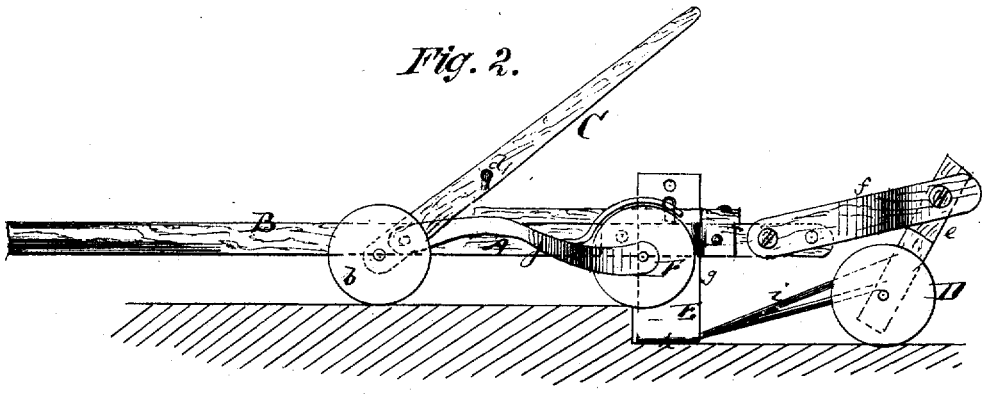
Figure 3:
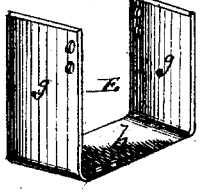
Figure 4:
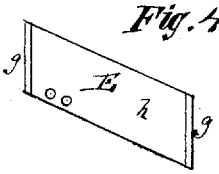

Figure 1 represents a plan or top view of my improved prairie-breaker. Fig. 2 is a side elevation of the same. Fig. 3 is a perspective view of the cutter. Fig. 4 is a top view of the slanting cutter.

Similar letters of reference indicate corresponding parts.

First, it consists in a turn plow formed of a flat-bottomed and perpendicular-sided share and inclined wires. Secondly, it consists in adjusting the pitch of plow by means of a pivoted-arm standard-wheel. Thirdly, it consists in bearing off from the path of the share all long grass and weeds by a pivoted and inclined arm attached to a wheel running on the land.

A represents the platform, and B the tongue pivoted thereto. C C are lever-arms pivoted to platform, connected together by cross-bar *d*, and provided with wheels *b b*. E is the share having flat bottom *h* and perpendicular sides *g g*. These sides *g g* are perforated at one or more points near the top to receive a cross-bar, and are held in guides on the side of platform. *i* represents two or more wires which connect with the rear of plow-bottom *h*, and rise at varying inclinations to form a mold-board which shall receive and turn the sod after it leaves the share. D is a wheel which holds a standard, *e*, that receives and supports the rear end of wires. *f* is a pivoted arm to which standard *e* is itself pivoted near the end. F is a wheel attached to pivoted arm *j*, and of which both move on the unplowed land in advance of and also on a line with share. The depth of the cut is regulated by adjusting the wheels *b b* D and their arms E *f*, when the share E will accommodate itself to their height by sliding up or down its guides. The pitch of the plow is changed by changing the angle formed by the standard *e* and arm *f*. This is accomplished by loosening their connecting clamp-screw and pushing outwardly the wheel D, which has the effect of drawing the share E slightly back and giving the obliquity required. The removal of long grass, weeds, and trash which hangs over from the sod, (that is not to be cut until the next furrow,) and which is liable to cling to the landside and clog the share, is secured by the loosely-pivoted arm *j* and wheel F, which incline outwardly from the front toward the rear of platform.

Having thus described all that is necessary to a full understanding of my invention, what I esteem to be new and desire to protect by Letters Patent, is—

1. The standard *e* pivoted to arm *f*, so that it can move upward and outward, combined with wheel D and wires *i*, to regulate the pitch of mold-board, all as set forth.

2. The outwardly-inclined and loosely-pivoted arm *j* and wheel F, combined with and arranged with respect to the share E, to remove recumbent grass or weeds, as set forth.

3. The turn-plow formed of flat-bottomed and three-sided share *g h g*, and wires *i i*, constructed and arranged as shown in the drawing and set forth in the description.

CORNELIUS M. CLARK.

Witnesses:
CHAS. A. PETTIT,
SOLON C. KEMON.